(12) United States Patent
Chang et al.

(10) Patent No.: US 12,402,199 B2
(45) Date of Patent: *Aug. 26, 2025

(54) METHOD AND DEVICE FOR CONDITIONAL HANDOVER

(71) Applicant: SHARP KABUSHIKI KAISHA, Sakai (JP)

(72) Inventors: Ningjuan Chang, Shanghai (CN); Shohei Yamada, Sakai (JP); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,293

(22) Filed: Sep. 25, 2023

(65) Prior Publication Data

US 2024/0015626 A1 Jan. 11, 2024

Related U.S. Application Data

(63) Continuation of application No. 16/471,190, filed as application No. PCT/CN2017/117173 on Dec. 19, 2017, now Pat. No. 11,818,620.

(30) Foreign Application Priority Data

Dec. 23, 2016 (CN) .......................... 201611217085.4

(51) Int. Cl.
*H04W 76/27* (2018.01)
*H04W 36/00* (2009.01)
(Continued)

(52) U.S. Cl.
CPC ....... *H04W 76/27* (2018.02); *H04W 36/0058* (2018.08); *H04W 36/0069* (2018.08);
(Continued)

(58) Field of Classification Search
None
See application file for complete search history.

(56) References Cited

U.S. PATENT DOCUMENTS

2009/0042614 A1* 2/2009 Karaoguz ............ H04B 7/0617
455/561
2015/0111569 A1* 4/2015 Gupta ................... H04W 72/21
455/552.1

(Continued)

OTHER PUBLICATIONS

Simone Barbera, Synchronized RACH-less Handover Solution for LTE Heterogeneous Networks, 2015, p. 1-5.*

*Primary Examiner* — Ayman A Abaza
*Assistant Examiner* — Camquyen Thai
(74) *Attorney, Agent, or Firm* — ScienBiziP, P.C.

(57) ABSTRACT

A method performed by a base station (BS) is provided. The method receives, from a user equipment (UE), a message indicating that the UE is capable of performing a conditional handover. The method then transmits, to the UE, a set of one or more conditional handover configurations. Each conditional handover configuration in the set of conditional handover configurations includes information associated with a corresponding candidate cell, and a handover condition comprising a measurement event based on a signal quality of at least one of a serving cell and the corresponding candidate cell.

18 Claims, 5 Drawing Sheets

(51) Int. Cl.
*H04W 36/08* (2009.01)
*H04W 36/36* (2009.01)

(52) U.S. Cl.
CPC ....... *H04W 36/0072* (2013.01); *H04W 36/08* (2013.01); *H04W 36/362* (2023.05)

(56) References Cited

U.S. PATENT DOCUMENTS

2016/0135100 A1* 5/2016 Teyeb .................. H04W 84/12
370/331
2016/0345222 A1* 11/2016 Axmon ............. H04W 36/0072

* cited by examiner

METHOD AND DEVICE FOR CONDITIONAL HANDOVER

CROSS-REFERENCE TO RELATED APPLICATION(S)

This application is a continuation application of U.S. patent application Ser. No. 16/471,190, filed on Jun. 19, 2019, which is a national stage application of International Patent Application Serial No. PCT/CN2017/117173, filed on Dec. 19, 2017, which claims the benefit of and priority to Chinese Patent Application Serial No. 201611217085.4, filed on Dec. 23, 2016, the contents of all of which are hereby incorporated herein fully by reference for all purposes.

TECHNICAL FIELD

The present application relates to the field of wireless communications technology. More specifically, the present application relates to a device-to-device communication method, user equipment (UE), and a base station.

BACKGROUND

A new research project on 5G technical standards (see non-patent literature: RP-160671: New SID Proposal: Study on New Radio Access Technology) was proposed by NTT DOCOMO in the 3rd Generation Partnership Project (3GPP) RAN #71 plenary session held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communication (eMBB), massive Machine Type Communication (mMTC), and Ultra Reliable and Low Latency Communication (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

The mobility of a connected-state user is implemented mainly by means of handover in a current Long Term Evolution (LTE) system. The procedure is briefly described as follows:

Stage 1: A base station delivers a measurement configuration to UE, and the UE performs measurement based on the measurement configuration. When a configured reporting condition is met, the UE sends a measurement report to the base station. The base station determines, according to the received measurement report and other factors such as the payload of the base station, whether to hand over the UE.

Stage 2: If a handover is determined, a source base station triggers a handover preparation procedure and sends a handover request message to a target base station; the target base station determines, according to context of the UE in the handover request message, resources of the target base station, and other factors, whether to admit the UE. If yes, the target base station feeds back a handover acknowledgment message to the source base station, where the handover acknowledgment message includes a handover command.

Stage 3: The source base station delivers the handover command to the UE, and starts forwarding data to the target base station. The UE executes the handover command immediately after receiving the handover command, and accesses the target base station.

Stage 4: After confirming a successful access of the UE, the target base station sends a handover completion message to the source base station.

It can be seen from the above that, the handover procedure in the LTE system may incur data transmission interruption. In an LTE system of a subsequent version, optimizations for the handover procedure, such as random access-less handover, all aim to shorten a handover delay and reduce handover overheads.

The 5G NR technology requires a shortest data interruption delay possible of 0 ms in a mobility handover procedure, so as to meet the mobility requirement for seamless handover in the NR. In the current handover procedure, one reason for handover failure and therefore long data transmission interruption is that the handover command is not delivered in time. To solve this problem, a feasible solution is conditional handover. In the conditional handover, a relatively conservative measurement report threshold is set, such that the base station acquires a measurement result in advance, and executes a handover preparation procedure with a selected target base station according to the measurement result. As such, the base station can deliver the handover command to the UE before an authentic handover condition is met, where the handover command carries a handover execution condition. Different from the current handover mechanism in the LTE system, this solution allows the UE not to execute a handover immediately after receiving the handover command. Instead, the UE performs monitoring according to the handover condition carried in the handover command message, and starts executing the handover command when detecting that the handover condition is met, so as to access a target cell.

SUMMARY

How to improve user mobility to achieve interruption time of 0 ms is a problem in urgent need to be solved in a next-generation communication system.

According to a first aspect of the present application, a method executed by a user equipment (UE) is provided. The method includes receiving from a base station a first Radio Resource Control (RRC) message containing a handover command; storing a handover configuration included in the first RRC message; and managing the handover configuration.

In an embodiment of the first aspect, the managing of the handover configuration includes starting a timer, where the timer is used for management of the handover configuration.

In another embodiment of the first aspect, the timer is started only when the first RRC message includes a configuration related to the timer.

In another embodiment of the first aspect, the first RRC message includes a first condition, and the method further includes: executing a handover procedure when the first condition is met.

In another embodiment of the first aspect, the method further includes stopping the timer when execution of a handover procedure is started, or when a second RRC message is received and the UE has stored the handover configuration received from the first RRC message.

In another embodiment of the first aspect, the method further includes considering that the timer expiry when execution of a handover process is started, or when a second RRC message is received and the UE has stored the handover configuration received from the first RRC message.

In another embodiment of the first aspect, the method further includes, when the timer is stopped or expires, releasing the stored handover configuration received from the first RRC message.

In another embodiment of the first aspect, the configuration related to the timer includes a value of the timer.

In another embodiment of the first aspect, the first RRC message includes a second condition, and the managing the handover configuration includes: releasing the stored handover configuration when the second condition is met.

In another embodiment of the first aspect, the second condition includes a measurement event.

According to a second aspect of the present application, a user equipment (UE) is provided. The UE includes a receiving unit, configured to receive from a base station a first Radio Resource Control (RRC) message containing a handover command; a storage unit, configured to store a handover configuration included in the first RRC message; and a management unit, configured to manage the handover configuration.

In an embodiment of the second aspect, the management unit is configured to start a timer, where the timer is used for management of the handover configuration.

In another embodiment of the second aspect, the management unit is configured to start the timer only when the first RRC message includes a configuration related to the timer.

In another embodiment of the second aspect, the first RRC message includes a first condition, and the UE further includes: a handover unit, configured to execute a handover process when the first condition is met.

In another embodiment of the second aspect, the management unit is configured to stop the timer when execution of a handover process is started, or when a second RRC message is received and the UE has stored the handover configuration received from the first RRC message.

In another embodiment of the second aspect, the management unit is configured to consider that the timer expiry when execution of a handover process is started, or when a second RRC message is received and the UE has stored the handover configuration received from the first RRC message.

In another embodiment of the second aspect, the management unit is configured to release the stored handover configuration received from the first RRC message, when the timer is stopped or expires.

In another embodiment of the second aspect, the configuration related to the timer includes a value of the timer.

In another embodiment of the second aspect, the first RRC message includes a second condition, and the management unit is configured to release the stored handover configuration when the second condition is met.

In another embodiment of the second aspect, the second condition includes a measurement event.

According to a third aspect of the present application, a method executed by a base station is provided. The method includes sending to user equipment (UE) a first Radio Resource Control (RRC) message containing a handover command, where the RRC message includes a handover condition; and stopping executing a corresponding handover when the handover condition is met.

In an embodiment of the third aspect, the handover condition includes a configuration of a timer; and the corresponding handover is stopped when the timer expires.

In another embodiment of the third aspect, the handover condition includes a second condition used for determining whether the handover command is valid; and the corresponding handover is stopped or canceled when the second condition indicates that the handover command is invalid.

In another embodiment of the third aspect, the method further includes: receiving a handover acknowledgment message from a target cell.

In another embodiment of the third aspect, the handover command includes information about a first condition; and the UE starts executing the handover when the first condition is met.

In another embodiment of the third aspect, the handover acknowledgment message includes an X2/Xn message.

According to a fourth aspect of the present application, a base station is provided. The base station includes a sending unit, configured to send to user equipment (UE) a first Radio Resource Control (RRC) message containing a handover command, where the RRC message includes a handover condition; and a handover management unit, configured to stop executing a corresponding handover when the handover condition is met.

In an embodiment of the fourth aspect, the handover condition includes a configuration of a timer; and the handover management unit is configured to stop the corresponding handover when the timer expires.

In another embodiment of the fourth aspect, the handover condition includes a second condition used for determining whether the handover command is valid; and the handover management unit is configured to stop or cancel the corresponding handover when the second condition indicates that the handover command is invalid.

In another embodiment of the fourth aspect, the base station further includes: a receiving unit, configured to receive a handover acknowledgment message from a target cell.

In another embodiment of the fourth aspect, the handover command includes information about a first condition; and the UE starts executing the handover when the first condition is met.

In another embodiment of the fourth aspect, the handover acknowledgment message includes an X2/Xn message.

According to a fifth aspect of the present application, a method performed by a base station (BS) is provided. The method includes receiving, from a user equipment (UE), a message indicating that the UE is capable of performing a conditional handover; and transmitting, to the UE, a set of one or more conditional handover configurations, each conditional handover configuration in the set of conditional handover configurations including information associated with a corresponding candidate cell, and a handover condition including a measurement event based on a signal quality of at least one of a serving cell and the corresponding candidate cell.

In an embodiment of the fifth aspect, the message further indicates that the UE is capable of performing the conditional handover without requiring to receive a command from the BS to perform the conditional handover.

In another embodiment of the fifth aspect, after transmitting, to the UE, the set of conditional handover configurations, the UE stores the set of conditional handover configurations; and performs a handover monitoring to evaluate one or more handover conditions included in the set of conditional handover configurations.

In another embodiment of the fifth aspect, during performing the handover monitoring, if the UE determines that a handover condition of a conditional handover configuration in the set of conditional handover configurations is met, the UE performs the conditional handover to handover to a candidate cell that is associated with the conditional handover configuration.

In another embodiment of the fifth aspect, the UE further releases the stored set of conditional handover configurations after determining that the conditional handover is successfully performed.

Another embodiment of the fifth aspect further includes transmitting, to the UE, a radio resource control (RRC) message, where the UE releases at least one of the stored set of conditional handover configurations that is associated with an identifier that is included in the RRC message.

Another embodiment of the fifth aspect further includes transmitting, to the UE, a radio resource control (RRC) message to indicate to the UE to transition to an RRC Inactive state, where, after receiving the RRC message, the UE releases the stored set of conditional handover configurations, and transitions to the RRC Inactive state.

In another embodiment of the fifth aspect, the UE releases the stored set of conditional handover configurations after detecting a radio link failure.

In another embodiment of the fifth aspect, each of the one or more handover conditions is configured by a measurement identifier that is used to indicate a measurement report configuration associated with each of the one or more handover conditions, the measurement report configuration includes information used to indicate the measurement report configuration is associated with one of the one or more handover conditions, and the UE does not perform a measurement report associated with the measurement report configuration.

In another embodiment of the fifth aspect, the message comprises a UEcapabilityinformation message.

According to a sixth aspect of the present application, a base station (BS) including one or more non-transitory computer-readable media storing one or more computer-executable instructions is provided. The BS further includes at least one processor that is coupled to the one or more non-transitory computer-readable media, and that is configured to execute the one or more computer-executable instructions to cause the BS to receive, from a user equipment (UE), a message indicating that the UE is capable of performing a conditional handover; and transmit, to the UE, a set of one or more conditional handover configurations, each conditional handover configuration in the set of conditional handover configurations including information associated with a corresponding candidate cell, and a handover condition including a measurement event based on a signal quality of at least one of a serving cell and the corresponding candidate cell.

By means of the technical solutions in the present application, data transmission interruption time in a handover process in an NR system may be further shortened, and a UE may properly manage handover configuration information, thus avoiding unnecessary wrong handovers, and signaling overheads and service interruption caused thereby.

The present application is also applicable to LTE systems in addition to the NR system. Moreover, the present application is also applicable to other handover methods in addition to a conditional handover method.

BRIEF DESCRIPTION OF DRAWINGS

The above and other features of the present application will become more apparent through the following detailed description made in conjunction with the accompanying drawings, where.

Figure 1:
FIG. 1 is a flowchart of a method executed by UE according to an embodiment of the present application.

Many aspects of the present application can be better understood with reference to the accompanying drawings. The components in the figures are not drawn to scale, but are only used to show the principle of the present application. In order to facilitate the illustration and description of some parts of the present application, the corresponding parts in the accompanying drawings may be enlarged or shrunk.

Elements and features described in one drawing or one implementation manner of the present application may be combined with elements and features illustrated in one or more other drawings or implementation manners. In addition, in the accompanying drawings, like numerals indicate corresponding parts in several drawings, and can be used to represent corresponding parts used in more than one implementation manners.

DETAILED DESCRIPTION OF EMBODIMENTS

With reference to the following description and accompanying drawings, specific implementation manners of the present application are disclosed in detail, and manners in which the principle of the present application is implemented are illustrated. It should be understood that, the implementation manners of the present application are not limited in scope in this case. The implementation manners of the present application include many variations, modifications, and equivalents within the spirit and the scope of clauses of the appended claims.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps or components, but do not exclude the existence or addition of one or more of other features, whole pieces, steps, or components.

A handover method provided by the present invention is further described below with reference to the accompanying drawings and specific embodiments.

The present application is described based on an Evolved Universal Terrestrial Radio Access Network (E-UTRAN), NR, and a corresponding core network and next-generation core network. It should be noted that, in addition to the E-UTRAN, NR, and the corresponding core network and next-generation core network, the present application is also applicable to other evolved radio communication systems, such as a 6G radio communication system; or is also applicable to other deployment scenarios, such as a dual-connection/multi-connection scenario. It should be noted that, definitions and nomenclatures of a base station, a cell, a source base station, a source cell, a target base station, and a target cell may vary in different deployment scenarios or different radio communication systems. The present application is also applicable to these scenarios or systems using different nomenclatures. For example, an evolved node B (eNB) may also be replaced with an NR node B (gNB). Likewise, in the NR and/or an E-UTRAN communication system of a subsequent version, based on LTE, a radio protocol layer includes all or some functions provided by a Radio Resource Control (RRC) layer, a Packet Data Convergence Protocol (PDCP) layer, a Radio Link Control (RLC), and a MAC layer; and may further include other functions not provided by the PDCP layer, the RLC layer, and the MAC layer, such as a beam management function. The protocol layers described in the present application include the RRC layer, the PDCP layer, the RLC layer, the MAC layer, and all concepts equivalent to the radio protocol layer applicable to the E-UTRAN, the NR, and other systems.

In the present application, a source cell may also be referred to as a source base station, a source beam, or a source Transmission Point (TRP). A target cell may also be referred to as a target base station, a target beam, or a target TRP. The source cell refers to a base station serving UE before a handover process is executed, or a cell serving the UE or on which the UE camps before a cell reselection occurs. The target cell refers to a base station serving the UE after the handover process is executed, or in other words, a cell indicated in a handover command; or a cell serving the UE or on which the UE camps after the cell reselection occurs.

In the present application, before receiving an RRC message containing a handover command, the UE still maintains communication, including data transmission, with the source base station before a handover is executed, thus shortening data transmission interruption time.

FIG. 1 is a flowchart of a method executed by UE according to an embodiment of the present application. As shown in FIG. 1, the method includes the following steps:

Step S110: Start execution of the method.

Step S120: Receive a first RRC message containing a handover command from a base station.

Step S130: Store a handover configuration included in the first RRC message.

Step S140: Manage the handover configuration. Preferably, a timer for management of the handover configuration is started to perform management. Further, the timer is started only when the first RRC message includes a configuration related to the timer. For example, the configuration related to the timer includes a value of the timer.

Alternatively, the timer is stopped when execution of a handover procedure is started, or when a second RRC message is received and the UE has stored the handover configuration received from the first RRC message.

Alternatively, UE considers the timer expiry when execution of a handover process is started, or when a second RRC message is received and the UE has stored the handover configuration received from the first RRC message.

Alternatively, when the timer is stopped or expires, the stored handover configuration received from the first RRC message is released.

Alternatively, the first RRC message may include a first condition; and the method further includes: executing the handover process when the first condition is met.

Alternatively, the first RRC message may include a second condition, and the managing the handover configuration (step S140) may include: releasing the stored handover configuration when the second condition is met. For example, the second condition may include a measurement event.

Step S150: The method ends.

Figure 2:
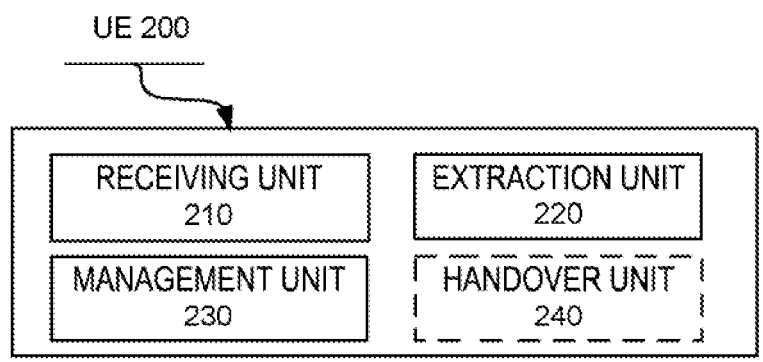
FIG. 2 is a block diagram of UE according to an embodiment of the present application.

FIG. 2 is a block diagram of UE according to an embodiment of the present application. As shown in FIG. 2, the UE 200 includes a receiving unit 210, a storage unit 220, and a management unit 230; and optionally includes a handover unit 240. Persons skilled in the art should understand that, the UE 200 may further include other functional units indispensable for implementing functions thereof, such as various processors, storage devices, radio frequency signal processing units, baseband signal processing units, and other units. However, for simplicity, a detailed description of these well-known elements is omitted.

The receiving unit 210 is configured to receive a first RRC message containing a handover command from a base station.

The storage unit 220 is configured to store a handover configuration included in the first RRC message.

The management unit 230 is configured to manage the handover configuration. For example, the management unit 230 can be configured to start a timer, where the timer is used for management of the handover configuration. Preferably, the management unit 230 can be configured to start the timer only when the first RRC message includes a configuration related to the timer. For example, the configuration related to the timer includes a value of the timer.

Alternatively, the management unit 230 can be configured to stop the timer when execution of a handover process is started, or when a second RRC message is received and the UE has stored the handover configuration received from the first RRC message.

Alternatively, the management unit 230 can be configured to consider the timer expired when execution of a handover procedure is started, or when a second RRC message is received and the UE has stored the handover configuration received from the first RRC message.

Alternatively, the management unit 230 can be configured to release the stored handover configuration received from the first RRC message when the timer is stopped or expires.

In addition, the handover unit 240 can be configured to execute the handover process when a first condition included in the first RRC message is met.

Alternatively, the management unit 230 can be configured to release the stored handover configuration when a second condition included in the first RRC message is met. For example, the second condition may include a measurement event.

Figure 5:
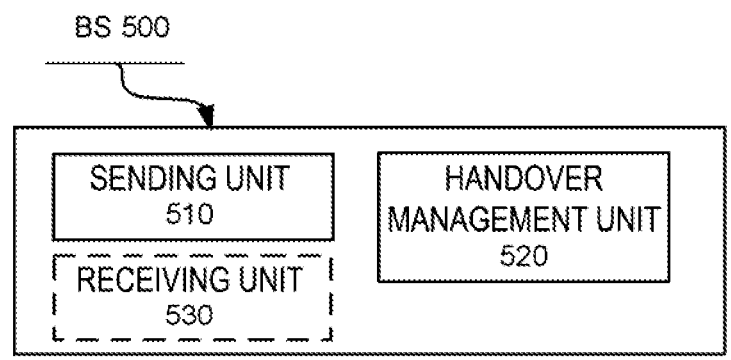
FIG. 5 is a block diagram of a base station according to an embodiment of the present application.

FIG. 5 is a block diagram of a base station according to an embodiment of the present application. As shown in FIG. 5, the base station 500 includes a sending unit 510 and a handover management unit 520; and optionally includes a receiving unit 530. Persons skilled in the art should understand that, the base station 500 may further include other functional units indispensable for implementing functions thereof, such as various processors, storage devices, radio frequency signal processing units, baseband signal processing units, and other units. However, for simplicity, a detailed description of these well-known elements is omitted.

The sending unit 510 is configured to send a first RRC message containing a handover command to UE, where the RRC message includes a handover condition. Alternatively, the handover command includes information about a first condition. When the first condition is met, the UE starts executing a handover.

The handover management unit 520 is configured to stop executing the corresponding handover when the handover condition is met.

For example, the handover condition includes a configuration of a timer. In this case, the handover management unit 520 is configured to stop the corresponding handover when the timer expires.

For example, the handover condition includes a second condition which is used for determining whether the handover command is valid. In this case, the handover management unit 520 is configured to stop or cancel the corresponding handover when the second condition indicates that the handover command is invalid.

The receiving unit 530 is configured to receive a handover acknowledgment message from a target cell. For example, the handover acknowledgment message is included an X2/Xn message.

Operations between the UE and the base station are described in detail below by using specific embodiments. These operations may be implemented by the UE 200 shown in FIG. 2 and the base station 500 shown in FIG. 5.

Embodiment 1 Timer-Based Handover Configuration Information Management Method In this embodiment, a UE side manages received handover configuration information based on a timer. Briefly, when the timer is running, the UE considers that a received or stored handover configuration is valid; when the timer is not running, for example, when the timer expires or is stopped, the UE considers that the received or stored handover configuration is invalid, or the UE releases/clears/discards the received or stored handover configuration information.

The timer may be referred to as a validity timer. Specifically, an implementation method in this embodiment is described below.

In an implementation manner, upon receiving a first RRC message containing a handover command and sent by a source base station, the UE or a UE RRC layer performs the following operations:

1. starting or restarting the validity timer; and
2. storing the received handover configuration.

The timer is used for management of the handover configuration. Optionally, the handover configuration includes all or part of configurations in the RRC message containing the handover command; or the handover configuration includes a configuration in the handover command. In other implementation manners, the handover configuration is expressed as the handover command.

Optionally, the handover command includes one or a combination of more of mobility control information (for example, a cell identifier, cell frequency, and random access information) of a target cell, system information of a target cell, as well as a radio resource configuration, a measurement configuration, security information, and a secondary cell configuration for the UE in the target cell.

Optionally, the foregoing operations are performed in no particular sequence.

Optionally, only when the UE or UE RRC layer receives the first RRC message containing the handover command and the message includes a configuration of the timer, the UE or UE RRC layer performs the operation 1.

Optionally, the handover is a conditional handover. That is, the handover command includes information about a first condition, and when the first condition is met, the UE starts executing a handover procedure.

For example, the first condition is a measurement event. For example, the first condition may be that signal quality of a neighboring cell is better than that of a serving cell by a value exceeding a threshold for a period of time, where the neighboring cell corresponds to a handover target cell.

In another implementation manner, when the UE starts executing the handover procedure, or the UE receives a second RRC message and has the stored handover configuration received from the first RRC message, the UE or UE RRC layer stops the validity timer or considers that the validity timer expired.

When the validity timer is stopped or expires, the UE releases the stored handover configuration received from the first RRC message. Herein, "releasing" may be expressed as "discarding", "clearing", or the like. Optionally, the UE RRC layer (which gives an instruction to a lower layer) cancels sending of a handover indication (refer to Embodiments 15 to 17 described below).

The second RRC message is used for releasing an RRC connection, or instructing the UE to enter an inactive state; or used for instructing the UE to suspend the RRC connection (RRC suspend). Further, the second RRC message may be an RRC connection reconfiguration message or an RRC connection release message. It should be noted that, the inactive state herein refers to a state between an RRC connected state and an RRC idle state, which is not specifically named in NR. In some cases, the inactive state may be referred to as a new state, which may be an independent RRC state, or a sub-state of the RRC connected state or the RRC idle state. In an LTE or E-UTRAN system, the inactive state may also be referred to as a light connected state. In the present application, commands and definitions in other forms regarding this state all fall within the scope of the present application.

In an implementation manner, the validity timer is configured by the base station by using an RRC message, such as the first RRC message containing the handover command. The configuration of the validity timer includes a value of the timer. Optionally, the validity timer is configured by a source cell or a target cell. Optionally, in a scenario which supports a plurality of handover commands or a plurality of handover target cells, the validity timer and/or the configuration is configured to be different or distinguishable for each handover command or each target cell; or the validity timer is such configured to be distinguishable for the handover commands or the target cells from each other, while the value of the timer is a common value shared by all the handover commands or target cells.

Optionally, if the validity timer is such configured as to be distinguishable for the target cells or the handover commands from each other, the foregoing solution in this embodiment is such carried out individually for each target cell or each handover command.

The foregoing method in this embodiment is also applicable to a non-handover scenario, such as UE-based mobility, or further, a cell reselection. The following implementation manner is described with reference to the UE-based mobility.

In an implementation manner, the UE receives a cell reselection configuration sent by the base station. The cell reselection parameters are received by using dedicated signaling, such as an RRC connection release message, an RRC connection reconfiguration message, and the like. The UE performs a cell reselection according to the received cell reselection configuration. The cell reselection occurs in an RRC idle state or an RRC inactive state. The UE manages the received cell reselection configuration based on the validity timer. The validity timer may be configured by using broadcast signaling or dedicated signaling. Further, the validity timer may be contained in the cell reselection configuration and configured for the UE together with the cell reselection configuration by using the dedicated signaling. The cell reselection configuration includes configuration information for the cell reselection, such as information about a preferred cell, priorities of reselected frequencies, priorities of reselected cells, and the like. The managing the received cell reselection configuration by the UE based on the validity timer includes: when the timer runs, the UE considers that the stored cell reselection configuration is valid; or when the timer does not run, for example, when the timer is stopped or times out, the UE considers that the stored cell reselection configuration is invalid, and/or the UE deletes the stored cell reselection configuration. The cell reselection configuration is used for the UE-based mobility, and further, for the cell reselection, and the cell reselection configuration may also be renamed as idle state mobility control information, inactive state mobility control information, or the like.

In an implementation manner, upon receiving a message containing the cell reselection configuration and sent by the base station, the UE or UE RRC layer performs the following operations:

1. starting or restarting the validity timer; and
2. storing the received cell reselection configuration.

The timer is used for management of the cell reselection configuration.

Optionally, the foregoing operations are performed in no particular sequence.

Optionally, only when the UE or UE RRC layer receives the cell reselection configuration and the message includes a configuration of the timer, the UE or UE RRC layer performs the operation 1.

In an implementation manner, when the UE enters an RRC connected state or an RRC idle state, or when a tracking area is updated, the UE or UE RRC layer stops the validity timer or considers that the validity timer expired.

When the validity timer is stopped or expires, the UE releases the stored cell reselection configuration. Herein, "releasing" may be expressed as "discarding", "clearing", or the like.

Another implementation manner may not rely on the validity timer. That is, in this implementation manner, the UE releases the stored cell reselection configuration when the UE enters the RRC connected state or the RRC idle state, or when the tracking area is updated.

Embodiment 2 Condition-Based Handover Configuration Information Management Method In this embodiment, a UE side manages a received handover configuration according to several conditions. When the conditions are not met, the UE or a UE RRC layer considers that the received or stored handover configuration is valid; or when the conditions are met, the UE or UE RRC layer considers that the received or stored handover configuration is invalid, or the UE or UE RRC layer releases the received or stored handover configuration. Herein, "releasing" may be expressed as "discarding", "clearing", or the like.

Specifically, an implementation method in this embodiment is described below.

Step 1: Upon receiving a first RRC message containing a handover command and sent by a source base station, the UE or UE RRC layer performs operations which include: storing the received handover configuration.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration for the UE in the target cell.

Step 2: When the second condition is met, the UE or UE RRC layer performs the following operation:
considering that the stored handover configuration is invalid, and/or
releasing the stored handover configuration.

The second condition is configured by the base station by using an RRC message. The RRC message may be a system message or a dedicated RRC message, such as an RRC connection reconfiguration message, and may further be the first RRC message containing the handover command. Optionally, the second condition is configured by the target cell or the source cell.

Based on measurement events defined in the LTE system, the second condition may be one or a combination of more of the following events, but is not limited to the following events:

event 1: a measurement value of signal quality of the serving cell is better than a threshold;
event 2: a measurement value of signal quality of the neighboring cell is worse than a threshold;
event 3: the measurement value of signal quality of the serving cell is better than that of the neighboring cell by a threshold; and
event 4: the measurement value of signal quality of the serving cell is better than a threshold and the measurement value of signal quality of the neighboring cell is worse than another threshold.

The neighboring cell in the foregoing events refers to the target cell corresponding to the handover command. Optionally, the serving cell and the target cell in the foregoing events may use different radio access technologies (RATs). Optionally, the configuration of the second condition or event may be based on configuration of measurement events in the LTE system. For example, when the second condition is the event 3, the threshold in the event is set to th, and a Time To Trigger (TTT) value is set to duration, the UE detects signal quality of the source cell and the target cell. When a difference between a measurement value of signal quality of the source cell and that of the neighboring cell is better than or equal to th, and this situation lasts for the duration, the UE considers that the second condition is met.

This embodiment is also applicable to a scenario which supports a plurality of handover commands or a plurality of handover target cells. In this scenario, the foregoing operations in this embodiment are such performed as to distinguish the handover commands or the handover target cells from each other. Specifically, the second condition is configured for each handover target cell, or is shared by all the handover target cells. In this embodiment, during the foregoing operations by the UE, when a second condition corresponding to one of the handover target cells is met, the UE performs corresponding operations merely for a handover configuration corresponding to this handover target cell.

Embodiment 3 Base Station Control-Based Handover Configuration Management Method In this embodiment, UE manages a received or stored handover configuration according to an instruction from a base station. That is, upon receiving a handover command, the UE considers that the corresponding handover configuration is valid. When receiving an invalidity indication sent by the base station, the UE considers that the received or stored handover configuration is invalid, or the UE releases the received or stored handover configuration.

An implementation manner of this embodiment is described in detail below.

Step 1: Upon receiving a first RRC message containing a handover command and sent by a source base station, the UE or a UE RRC layer performs operations which include: storing the received handover configuration.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration of the UE in the target cell.

Step 2: Receive indication information sent by the base station. The indication information is used for instructing the UE to cancel a corresponding handover. The indication information may be contained in the RRC message, or may also be MAC signaling.

Step 3: If the received message contains the indication information described in step 2, the UE:
considers that the corresponding stored handover configuration is invalid, and/or
releases the corresponding stored handover configuration.

Optionally, before step 2, the method further includes: reporting, by the UE, a measurement result (measurement report) to the base station.

This embodiment is also applicable to a scenario which supports a plurality of handover commands or a plurality of handover target cells. In this scenario, the foregoing operations are such performed as to distinguish the target cells from each other. Specifically, optionally, the indication information sent by the base station further include a target cell identifier, or an identifier which can be associated with a particular handover command or a particular target cell. In this case, the operation in step 3 is performed merely for a handover configuration corresponding to the handover command or target cell associated with the identifier in the indication information. In addition, optionally, in this scenario, if the instruction information sent by the base station does not include a target cell identifier, or an identifier which can be associated with a particular handover command or a particular target cell, the UE performs the operation in step 3 for handover configurations corresponding to all the handover commands or all the target cells.

Embodiment 4

Step 1: Upon receiving a first RRC message containing a handover command and sent by a source base station, UE or a UE RRC layer performs operations which include: storing the received handover configuration.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

Optionally, the handover command includes one or a combination of more of mobility control information (for example, a cell identifier, cell frequency, and random access information) of a target cell, system information of a target cell, a radio resource configuration, a measurement configuration, security information, and a secondary cell configuration for the UE in the target cell.

Step 2: Upon detecting that a Radio Link Failure (RLF) occurs, the UE or UE RRC layer performs the following operation:
considering that the stored handover configuration is invalid, and/or
releasing the stored handover configuration.

This embodiment is also applicable to a scenario which supports a plurality of handover commands or a plurality of handover target cells.

Embodiment 5

Step 1: Upon receiving a first RRC message containing a handover command and sent by a source base station, UE or a UE RRC layer performs operations which include: storing the received handover configuration.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

For example, the first condition is a measurement event. For example, the first condition may be that signal quality of a neighboring cell is better than that of a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration for the UE in the target cell.

Step 2: When the UE starts the handover procedure, or when a second RRC message is received and the UE has the stored handover configuration, the UE or UE RRC layer performs the following operation:

considering that the stored handover configuration is invalid, and/or releasing the stored handover configuration.

The second RRC message is used for releasing an RRC connection, or for instructing the UE to enter an inactive state, or for instructing the UE to suspend the RRC connection (RRC suspend). Further, the second RRC message may be an RRC connection reconfiguration message or an RRC connection release message. It should be noted that, the inactive state herein refers to a state between an RRC connected state and an RRC idle state, which is not specifically named in NR. In some cases, the inactive state may be referred to as a new state, which may be an independent RRC state, or a sub-state of the RRC connected state or the RRC idle state. In the present application, commands and definitions in other forms regarding this state all fall within the scope of the present application.

This embodiment is also applicable to a scenario which supports a plurality of handover commands or a plurality of handover target cells. In this scenario, the foregoing operations in this embodiment are such performed as to distinguish the handover commands or the handover target cells from each other. Specifically, the second condition is configured for each handover target cell, or is also shared by all the handover target cells. In this embodiment, during the foregoing operations by the UE, when a second condition corresponding to one of the handover target cells is met, the UE performs corresponding operations merely for a handover configuration corresponding to this handover target cell.

Embodiment 6

Step 1: Upon receiving a first RRC message containing a handover command and sent by a source base station, UE or a UE RRC layer performs operations which include: storing the received handover configuration.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

For example, the first condition is a measurement event. For example, the first condition is that signal quality of a neighboring cell is better than that in a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration for the UE in the target cell.

Step 2: When the UE receives another first RRC message containing a handover command and the UE has the stored handover configuration, the UE or UE RRC layer performs the following operation:

considering that the stored handover configuration is invalid, and/or releasing the stored handover configuration.

In this step, the UE behavior can also be described as that the UE performs an operation of replacing the stored handover configuration with a handover configuration in the received another first RRC message.

Embodiment 7

Step 1: Upon receiving a first RRC message containing a handover command and sent by a source base station, UE or a UE RRC layer performs operations which include: storing the received handover configuration.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration for the UE in the target cell.

Step 2: When the handover of the UE succeeds, the UE or UE RRC layer performs the following operation:

considering that the stored handover configuration is invalid, and/or releasing the stored handover configuration.

The successful handover of the UE may refer to that the UE (successfully) sends a handover completion message, namely, an RRC connection reconfiguration completion message, to the target cell.

Embodiment 8 Handover Configuration Management Method on a Base Station Side

This embodiment corresponds to Embodiment 1, and is implemented in a source base station during a handover. For example, this embodiment may be implemented by the base station shown in FIG. 5.

Step 1: Deliver an RRC message to UE, where the RRC message includes a configuration of a validity timer. The RRC message may be a first RRC message containing a handover command. The validity timer is used for management of the handover configuration. For example, the sending unit 510 in the base station 500 shown in FIG. 5 may be used to deliver the RRC message to the UE.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure.

For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration for the UE in the target cell.

Optionally, the method includes step 2: Stop or cancel the corresponding handover when the timer times out. For example, the handover management unit 520 in the base station 500 shown in FIG. 5 may be used to stop or cancel the corresponding handover.

This embodiment is also applicable to a scenario which supports a plurality of handover commands or a plurality of handover target cells. In this scenario, the validity timer and/or the value thereof is shared by the multiple handover commands or the multiple target cells, or can be such configured as to be distinguishable for the handover commands or the target cells from each other. In this scenario, the configurations and steps in this embodiment are all such provided as to be distinguishable for the handover commands or the target cells from each other. That is, related operations are performed merely for a corresponding target cell or an associated target cell.

Before step 1, the method optionally further includes: receiving a handover acknowledgment message (handover acknowledge) from the target cell, where the handover acknowledgment message includes the configuration of the validity timer. The message is an X2/Xn message, where X2/Xn refers to an interface between base stations or may also be named in other manners. That is, in this case, the timer is configured by the target cell. For example, the receiving unit 530 in the base station 500 shown in FIG. 5 may be used to receive the handover acknowledgment message from the target cell.

Same with Embodiment 1, the foregoing method in this embodiment is also applicable to a non-handover scenario, such as UE-based mobility, or further, a cell reselection. The following implementation manner is described with reference to the UE-based mobility.

In an implementation manner, the base station sends a cell reselection configuration to the UE. The cell reselection parameters are generated by using dedicated signaling, such as an RRC connection release message, an RRC connection reconfiguration message, and the like. The UE performs a cell reselection according to the received cell reselection configuration. The cell reselection occurs in an RRC idle state or an RRC inactive state. The UE manages the received cell reselection configuration based on the validity timer. The validity timer may be configured by using broadcast signaling or dedicated signaling. Further, the validity timer may be contained in the cell reselection configuration and configured for the UE together with the cell reselection configuration by using the dedicated signaling. The cell reselection configuration is used for the UE-based mobility, and further, for the cell reselection, and the cell reselection configuration may also be renamed as idle state mobility control information, inactive state mobility control information, or the like.

Embodiment 9

This embodiment corresponds to Embodiment 2, and is implemented in a source base station during a handover. For example, this embodiment may be implemented by the base station shown in FIG. 5.

Step 1: Deliver an RRC message to UE, where the RRC message includes a configuration of a second condition. The RRC message may be a first RRC message containing a handover command. The second condition is used for determining whether the handover configuration is valid, or used for determining whether to release the handover configuration. For example, the sending unit 510 in the base station 500 shown in FIG. 5 may be used to deliver the RRC message to the UE.

Optionally, the handover is a conditional handover. That is, the handover command includes information about a first condition, and when the first condition is met, the UE starts executing a handover procedure.

Optionally, the handover configuration includes all or part of configurations in the RRC message containing the handover command; or the handover configuration includes a configuration in the handover command.

Optionally, the handover command includes one or a combination of more of mobility control information (for example, a cell identifier, cell frequency, and random access information) of a target cell, system information, a radio resource configuration corresponding to the UE in the target cell, a measurement configuration, security information, and a secondary cell configuration.

Optionally, this embodiment includes step 2: The base station stops or cancels the corresponding handover when the second condition is met. It may be determined, according to a measurement report from the UE, whether the second condition is met. The measurement report from the UE is a measurement report triggered by the UE and sent to the base station when the configured second condition is met.

This embodiment is also applicable to a scenario which supports a plurality of handover commands or a plurality of handover target cells. In this scenario, the configuration of the second condition is shared by the multiple handover commands or the multiple target cells, or the second condition is such configured as to be distinguishable for the handover commands or the target cells from each other. In this scenario, the configurations and steps in this embodiment are all such provided as to be distinguishable for the handover commands or the target cells from each other. That is, related operations are performed merely for a corresponding target cell or an associated target cell.

Before step 1, the method optionally further includes: receiving a handover acknowledgment message (handover acknowledge) from the target cell, where the handover acknowledgment message includes the configuration of the second condition. The message is an X2/Xn message, where X2/Xn refers to an interface between base stations or may also be named in other manners. That is, in this case, the second condition is configured by the target cell. For example, the receiving unit 530 in the base station 500 shown in FIG. 5 may be used to receive the handover acknowledgment message from the target cell.

Embodiment 10

This embodiment corresponds to Embodiment 3, and is implemented in a source base station during a handover.

Step 1: Deliver indication information to UE. The indication information is used for indicating the UE to cancel a corresponding handover. The indication information may be contained in an RRC message, or may also be MAC signaling. In other words, the information sent to the UE is used for indicating the UE to release a corresponding handover configuration.

Optionally, the handover is a conditional handover. That is, the handover command includes information about a first condition, and when the first condition is met, the UE starts executing a handover process.

For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover configuration includes all or part of configurations in the RRC message containing the handover command; or the handover configuration includes a configuration in the handover command.

Optionally, the handover command includes one or a combination of more of mobility control information (for example, a cell identifier, cell frequency, and random access information) of the target cell, system information of the target cell, a radio resource configuration, a measurement configuration, security information, and a secondary cell configuration for the UE in the target cell.

Optionally, before step 1, the method further includes: receiving a measurement result (measurement report) reported by the UE.

Optionally, after step 1, the method further includes step 2: Receive a response message/signaling sent by the UE.

This embodiment is also applicable to a scenario which supports a plurality of handover commands or a plurality of handover target cells. In this scenario, the foregoing operations are such performed as to be distinguishable for the target cells from each other. Specifically, optionally, the indication information delivered by the base station further includes a target cell identifier, or an identifier which can be associated with a particular handover command or a particular target cell.

The following embodiment describes a handover configuration management method on a base station side, which is performed in a target base station during a handover. For example, the base station shown in FIG. 5 may be used to implement the method.

Embodiment 11

This embodiment corresponds to Embodiment 1, and is implemented in a target base station during a handover.

Step 1: Send a handover acknowledgment message (handover acknowledge) to a source base station, where the handover acknowledgment message includes a configuration of a validity timer. The message is an X2/Xn message, where X2/Xn refers to an interface between base stations or may also be named in other manners. That is, in this case, the timer is configured by a target cell. Optionally, the configuration of the validity timer may be contained in an inter-node RRC message in the handover acknowledgment message. The validity timer is used for management of a handover configuration. For example, the sending unit 510 in the base station 500 shown in FIG. 5 may be used to send the handover acknowledgment message to the source base station.

Optionally, the handover configuration includes all or part of configurations in the RRC message containing the handover command; or the handover configuration includes a configuration in the handover command.

Optionally, the handover is a conditional handover. That is, the handover command includes information about a first condition, and when the first condition is met, the UE starts executing a handover procedure. For example, the first condition is a measurement event. For example, the first condition is that signal quality of a neighboring cell is better than that in a serving cell by a value exceeding a threshold for a period of time. The neighboring cell corresponds to a handover target cell.

Optionally, the handover command includes one or a combination of more of mobility control information (for example, a cell identifier, cell frequency, and random access information) of the target cell, system information, a radio resource configuration, a measurement configuration, security information, and a secondary cell configuration for the UE in the target cell.

Optionally, this embodiment further includes step 2: Stop or cancel the corresponding handover when the timer expires. For example, the handover management unit 520 in the base station 500 shown in FIG. 5 is used to stop or cancel the corresponding handover.

Optionally, before step 1, the method further includes: receiving a handover request message sent by the source base station.

This embodiment is also applicable to a scenario which supports a plurality of handover commands or a plurality of handover target cells. In this scenario, the validity timer and/or the value thereof is shared by the multiple handover commands or the multiple target cells, or can be such configured as to be distinguishable the handover commands or the target cells from each other. In this scenario, the configurations and steps in this embodiment are all such provided as to be distinguishable the handover commands or the target cells from each other. That is, related operations are performed merely for a corresponding target cell or an associated target cell.

Embodiment 12

This embodiment corresponds to Embodiment 2, and is implemented in a target base station during a handover.

Step 1: Send a handover acknowledgment message (handover acknowledge) to a source base station, where the handover acknowledgment message includes a configuration of a second condition. The message is an X2/Xn message, where X2/Xn refers to an interface between base stations or may also be named in other manners. That is, in this case, the second condition is configured by a target cell. Optionally, the configuration of the second condition may be carried in an inter-node RRC message in the handover acknowledgment message. The second condition is used for determining whether the handover configuration is valid, or for determining whether to release the handover configuration.

Optionally, the handover is a conditional handover. That is, the handover command includes information about a first condition, and when the first condition is met, the UE starts executing a handover procedure. For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover configuration includes all or part of configurations in the RRC message containing the handover command; or the handover configuration includes a configuration in the handover command.

Optionally, the handover command includes one or a combination of more of mobility control information (for example, a cell identifier, cell frequency, and random access information) of the target cell, system information, a radio resource configuration, a measurement configuration, security information, and a secondary cell configuration for the UE in the target cell.

Optionally, before step 1, the method further includes: receiving a handover request message sent by the source base station.

This embodiment is also applicable to a scenario which supports a plurality of handover commands or a plurality of handover target cells. In this scenario, the configuration of the second condition is shared by the multiple handover commands or the multiple target cells, or the second condition is such configured as to be distinguishable the handover commands or the target cells from each other. In this scenario, the configurations and steps in this embodiment are all such provided as to be distinguishable the handover commands or the target cells from each other. That is, related operations are performed merely for a corresponding target cell or an associated target cell.

The following embodiment describes a conditional handover capability indication/acquisition method based on an air interface.

Embodiment 13

UE reports information about its capability of supporting conditional handovers to a base station.

The conditional handover means that, a handover command includes information about a first condition and when the first condition is met, the UE starts executing a handover process. For example, the first condition is a measurement event. For example, the first condition is that signal quality of a neighboring cell is better than that of a serving cell by a value exceeding a threshold for a period of time. The neighboring cell corresponds to a handover target cell.

The information about the capability of the UE of supporting conditional handovers may be contained in a UEcapabilityinformation message; or may be reported in other manners. For example, the information may be explicitly or implicitly indicated in another RRC message. A format thereof is, for example, as follows:

Conditionalhandover-rxx ENUMERATED {supported} Optional

The base station determines, according to the capability information of the UE, whether to carry out a conditional handover for mobility of the UE.

In another implementation manner, the UE reports information about its capability of supporting UE-based mobility to the base station. The UE-based mobility may be a cell reselection in an RRC connected state; or may refer to a conditional handover in the RRC connected state.

The information about the capability of the UE of supporting the UE-based mobility may be contained in the UEcapabilityinformation message; or may be reported in other manners. For example, the information is explicitly or implicitly indicated in another RRC message. A format thereof is, for example, as follows:

| | |
|---|---|
| UE-based mobility-rxx OPTIONAL | ENUMERATED{supported} |
| or | |
| Connected-cell-reselection-rxx OPTIONAL | ENUMERATED{supported} |

The base station determines, according to the capability information of the UE, whether to implement the UE-based mobility for the UE.

The following embodiment describes a conditional handover capability indication/acquisition method based on the X2/Xn interface.

Embodiment 14

A first base station indicates to a second base station whether the first base station supports a conditional handover. The indication information is carried in an X2/Xn message which may be, for example, an X2/Xn setup/eNB configuration update message. X2/Xn refers to an interface between base stations, or may also be named in other manners in other systems.

The conditional handover means that, a handover command includes information about a first condition and when the first condition is met, the UE starts executing a handover procedure. For example, the first condition is a measurement event. For example, the first condition is that signal quality of a neighboring cell is better than that of a serving cell by a value exceeding a threshold for a period of time. The neighboring cell corresponds to a handover target cell.

In another implementation manner of this embodiment, a source base station indicates, by using a handover request message in a handover preparation procedure, to a target base station that the current handover is a conditional handover. The indication information is carried in an X2/Xn message. The target base station may perform configuration of a message such as a handover command or a handover response based on the indication information, for example, configure the timer described in Embodiment 1.

In another implementation manner of this embodiment, the target base station indicates, by using a handover acknowledgment message in a handover preparation process, to the source base station that the current handover is a conditional handover. The indication information is carried in the X2/Xn message. The source base station may perform corresponding operations on the UE based on the indication information. For example, the source base station determines whether to still maintain communication with the UE after the handover command is delivered.

The following embodiment describes a handover method executed by a UE side.

Embodiment 15

Step 1: Upon receiving a first RRC message containing a handover command and sent by a source base station, UE or UE RRC layer performs operations which include: storing received handover configuration.

Optionally, the handover is a conditional handover. That is, the handover command includes information about a first condition, and when the first condition is met, the UE starts executing a handover procedure. For example, the first condition is a measurement event. For example, the first condition is that signal quality of a neighboring cell is better than that of a serving cell by a value exceeding a threshold for a period of time. The neighboring cell corresponds to a handover target cell.

Optionally, the handover configuration includes all or part of configurations in the RRC message containing the handover command; or the handover configuration includes a configuration in the handover command.

Optionally, the handover command includes one or a combination of more of mobility control information (for example, a cell identifier, cell frequency, and random access information) of a target cell, system information, a radio resource configuration, a measurement configuration, security information, and a secondary cell configuration for the UE in the target cell.

Step 2: When the first condition is met, the UE sends a handover indication to a base station, where the handover indication is used to notify the base station that the UE is about to start handover, or in other words, the handover indication is used to notify the base station that handover occurs, or in other words, to notify the base station that the first condition is met.

Step 3: The UE executes handover, that is, the UE performs synchronization and accesses a target cell. In this step, the UE uses the configurations in the stored handover command to access the target cell. This step is optional.

Optionally, after step 2 and/or before step 3, the method further includes step 2A: The UE receives a response sent by the base station.

In an implementation manner, the base station configures whether the UE can or needs to send the handover indication after the first condition is met. That is, the base station enables or disables sending of the handover indication by using an RRC message, where the RRC message may be a system message or an RRC message containing the handover command.

Implementation manners of step 2 and step 2A in this embodiment are described in the following Embodiments 16 to 19. It should be noted that, the implementation manners thereof are not limited to the content described in Embodiments 16 to 19.

Embodiment 16

In this embodiment, the handover indication in step 2 in Embodiment 15 uses a mode of MAC signaling. That is, the handover indication is a MAC CE. A MAC layer in the following description may also be referred to as a MAC entity.

In an implementation manner, when the first condition in step 1 in Embodiment 15 is met, a UE RRC layer instructs a lower layer to send a handover indication to a base station. The base station herein refers to a source base station.

In an implementation manner, upon receiving an instruction from an upper layer to send the handover indication, a UE MAC layer triggers sending of a handover indication MAC CE.

In an implementation manner, the handover indication MAC CE corresponds to a dedicated Logical Channel Identity (LCD).

A specific format of the handover indication MAC CE may vary according to the content and size thereof, which is described in the following several implementation manners. It should be noted that, the following description merely gives several examples, but the handover indication is not limited thereto. In an implementation manner, the content of the handover indication may include 1 bit, which is used to indicate whether UE is about to be handed over to a target cell, or in other words, to notify the base station that the first condition is met. In another implementation manner, the content of the handover indication may include a cell identifier, which is used to indicate a target cell to which the UE is about to be handed over, or in other words, to indicate a target cell which triggers the UE to start a handover, or in other words, to indicate a target cell which meets the first condition. In this implementation manner, there may be one or multiple cell identifiers. The cell identifier may also be a base station identifier, a beam identifier, or a Transmission Point or Transmission and Reception Point (TRP) identifier.

Figure 3:
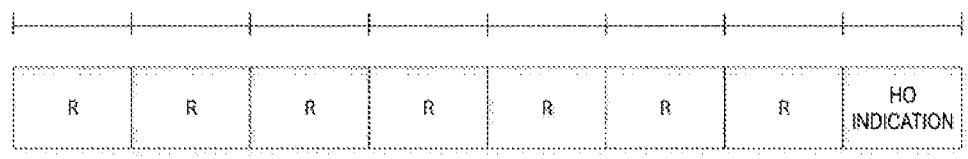
FIG. 3 is a schematic diagram of an exemplary format of a Medium Access Control (MAC) control element (CE)

In another implementation manner, the content of the handover indication may be a bit map, where each bit corresponds to a handover target cell or a handover command. A value of the bit indicates whether a handover to the target cell corresponding to the bit is triggered. For example, the value "0" indicates no, while the value "1" indicates yes. In the foregoing implementation manner, in the handover indication MAC CE, in addition to a valid bit, other bits may be reserved bits. FIG. 3 shows a format sample of a MAC CE, where R represents a reserved bit, and HO indication represents a valid bit in the handover indication.

In an implementation manner, when the MAC layer triggers sending of the handover indication MAC CE, the UE MAC layer performs the following operation:

In the case where the MAC entity has an allocated uplink resource for new transmission during a current TTI, the MAC entity uses a command multiplexing and combination process to generate and send a handover indication MAC CE if a handover indication process determines that the handover indication is triggered and is not canceled, and if the allocated uplink resource can accommodate the handover indication MAC CE and its corresponding MAC subheader according to a logical channel prioritization result.

In an implementation manner, when the MAC layer triggers sending of the handover indication MAC CE, the UE MAC layer performs the following operation:

In the case where the handover indication process determines that the handover indication is triggered and is not canceled, the MAC entity uses a command multiplexing and combination process to generate and send a handover indication MAC CE if the MAC entity has an allocated uplink resource for new transmission during the current TTI; otherwise, the MAC entity triggers a scheduling request if the MAC entity has no allocated or configured uplink permission.

In an implementation manner, in one or more of the following cases, if sending of a handover indication is triggered, the MAC layer cancels the triggered sending of the handover indication MAC CE:
    when an instruction is received from an upper layer to cancel sending of the handover indication;
    when the MAC layer is reset (MAC reset); and
    when the handover indication MAC CE is contained in a MAC PDU and is about to be sent.

In an implementation manner, when a validity timer is stopped or times out, the RRC layer instructs the MAC layer to cancel sending of the handover indication. Reference is made to Embodiment 1 for the validity timer.

In an implementation manner, for step 2A in Embodiment 15, a response to the handover indication MAC CE may be an HARQ ACK/NACK, or may also be a specific MAC CE. The specific MAC CE is used to respond to the handover indication sent by the UE, to confirm the handover to be executed. Optionally, the response MAC CE may also contain other information, such as a cell identifier, used to indicate a handover target cell. The cell identifier may also be a beam identifier, a base station identifier, or a TRP identifier. The case where the response MAC CE contains cell information may correspond to the foregoing case where the handover indication sent by the UE contains one or multiple cell identifiers.

In an implementation manner, the UE starts the handover to the target cell in one or more of the following cases:
    when the handover indication MAC CE is sent; and
    when the response to the handover indication MAC CE is received.

In an implementation manner, the UE MAC layer indicates to the upper layer that sending of the handover indication is completed. Upon receiving the handover indication sending completion information from the lower layer, the UE RRC layer executes the handover to the target cell.

Optionally, the executing, by the UE, the handover to the target cell includes: starting downlink synchronization to the target cell, resetting the MAC layer, reestablishing a PDCP/RLC layer (optional), and other operations. Herein, specific operations of executing the handover to the target cell by the UE are based on handover-related operations in the LTE system, and details are not described herein again.

Optionally, the UE considers that the target cell is a cell which meets the associated first condition and triggers a handover; or the UE considers that the target cell is a cell corresponding to the cell identifier carried in the response information corresponding to the handover indication MAC CE.

Embodiment 17

In this embodiment, the handover indication in step 2 in Embodiment 15 uses a mode of MAC signaling. Different from that in Embodiment 16, the MAC signaling in this embodiment is not a MAC CE, but a MAC subheader. That is, no MAC Service Data Unit (SDU) or MAC CE corresponding to the MAC subheader for the handover indication exists in a MAC payload behind a MAC header. A MAC layer in the following description may also be referred to as a MAC entity.

In an implementation manner, when the first condition in step 1 in Embodiment 15 is met, a UE RRC layer instructs a lower layer to send a handover indication to a base station. The base station herein refers to a source base station.

In an implementation manner, upon receiving an instruction from an upper layer to send the handover indication, a UE MAC layer triggers sending of handover indication MAC signaling.

In an implementation manner, the handover indication MAC signaling corresponds to a dedicated LCID.

Figure 4:
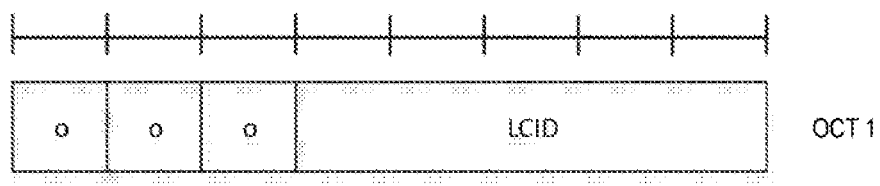
FIG. 4 is a schematic diagram of an exemplary format of a MAC subheader.

A specific format of the handover indication MAC signaling may vary according to the content and size thereof, which is described in the following several implementation manners. It should be noted that, the following description merely gives several examples, but the handover indication is not limited thereto. In an implementation manner, the content of the handover indication may include 1 bit, which is used to indicate whether the UE is about to be handed over to a target cell, or in other words, to notify the base station that the first condition is met. In another implementation manner, the content of the handover indication may include a cell identifier, which is used to indicate a target cell to which the UE is about to be handed over, or in other words, to indicate a target cell which triggers the UE to start a handover process, or in other words, to indicate a target cell which meets the first condition. In this implementation manner, there may be one or multiple cell identifiers. The cell identifier may also be a base station identifier, a beam identifier, or a TRP identifier. In another implementation manner, the content of the handover indication may be a bit map, where each bit corresponds to a handover target cell or a handover command. A value of the bit indicates whether a handover to the target cell corresponding to the bit is triggered. For example, the value "0" indicates no, while the value "1" indicates yes. In the foregoing implementation manner, in the handover indication MAC signaling, in addition to a valid bit, other bits may be R/E/F/L bits. FIG. 4 shows a format sample of the MAC subheader, where a bit o may be an R/E/F/L bit. The definition of the R/E/F/L bit is identical with that in a MAC subheader in the LTE system, and details are not described herein again.

In an implementation manner, when the MAC layer triggers sending of the handover indication MAC subheader, the UE MAC layer performs the following operation:

In the case where the MAC entity has an allocated uplink resource for new transmission during a current TTI, the MAC entity uses a command multiplexing and combination process to generate and send a handover indication MAC subheader if a handover indication process determines that the handover indication is triggered and is not canceled, and if the allocated uplink resource can accommodate the handover indication MAC subheader according to a logical channel prioritization result.

In an implementation manner, when the MAC layer triggers sending of the handover indication MAC subheader, the UE MAC layer performs the following operation:

In the case where the handover indication process determines that the handover indication is triggered and is not canceled, the MAC entity uses a command multiplexing and combination process to generate and send a handover indication MAC subheader if the MAC entity has an allocated uplink resource for new transmission during the current TTI; otherwise, the MAC entity triggers a scheduling request if the MAC entity has no allocated or configured uplink permission.

In an implementation manner, in one or more of the following cases, if sending of a handover indication is triggered, the MAC layer cancels the triggered sending of the handover indication MAC subheader:
    when an instruction is received from an upper layer to cancel sending of the handover indication;
    when the MAC layer is reset (MAC reset); and
    when the handover indication MAC subheader is contained in a MAC PDU and is about to be sent.

In an implementation manner, when a validity timer is stopped or times out, the RRC layer instructs the MAC layer to cancel sending of the handover indication. Reference is made to Embodiment 1 for the validity timer.

In an implementation manner, for step 2A in Embodiment 15, the response to the handover indication MAC subheader may be an HARQ ACK/NACK, or may also be a specific MAC CE. The specific MAC CE is used to respond to the handover indication sent by the UE, to confirm the handover to be executed. Optionally, the response MAC CE may also contain other information, such as a cell identifier, used to indicate a handover target cell. The cell identifier may also be a beam identifier, a base station identifier, or a TRP identifier. The case where the response MAC CE contains cell information may correspond to the foregoing case where the handover indication sent by the UE contains one or multiple cell identifiers.

In an implementation manner, the UE starts the handover to the target cell in one or more of the following cases:
    when the handover indication MAC subheader is sent; and
    when the response to the handover indication MAC subheader is received.

In an implementation manner, the UE MAC layer indicates to the upper layer that sending of the handover indication is completed. Upon receiving the handover indication sending completion information from the lower layer, the UE RRC layer executes the handover to the target cell.

Optionally, the executing, by the UE, the handover to the target cell includes: starting downlink synchronization to the target cell, resetting the MAC layer, reestablishing a PDCP/ RLC layer (optional), and other operations. Herein, specific operations of executing the handover to the target cell by the UE are based on handover-related operations in the LTE system, and details are not described herein again.

Optionally, the UE considers that the target cell is a cell which meets the associated first condition and triggers a handover; or the UE considers that the target cell is a cell corresponding to the cell identifier carried in the response information corresponding to the handover indication MAC subheader.

Embodiment 18

In this embodiment, the handover indication in step 2 in Embodiment 15 uses a mode of RRC signaling.

In an implementation manner, when the first condition in step 1 in Embodiment 15 is met, a UE RRC layer sends a handover indication to a base station. The base station herein refers to a source base station.

The handover indication is described in the following several implementation manners. It should be noted that, the following description merely gives several examples, but the handover indication is not limited thereto. In an implementation manner, the content of the handover indication may include 1 bit, which is used to indicate whether UE is about to be handed over to a target cell, or in other words, to indicate that the first condition is met. In another implementation manner, the content of the handover indication may include a cell identifier, which is used to indicate a target cell to which the UE is about to be handed over, or in other words, to indicate a target cell which triggers the UE to start a handover, or in other words, to indicate a target cell which meets the first condition. In this implementation manner, there may be one or multiple cell identifiers. The cell identifier may also be a base station identifier, a beam identifier, or a TRP identifier. In another implementation manner, the content of the handover indication may be a bit map, where each bit corresponds to a handover target cell or a handover command. A value of the bit indicates whether a handover to the target cell corresponding to the bit is triggered. For example, the value "0" indicates no, while the value "1" indicates yes. The handover indication may be an independent RRC message, or an Information Element (IE) in another RRC message.

In an implementation manner, when the RRC layer triggers sending of a handover indication message, the RRC layer delivers the handover indication message to a lower layer to realize sending of the handover indication.

In an implementation manner, for step 2A in Embodiment 15, a response to the handover indication may be RRC signaling, or may also be a specific MAC CE. The response to the handover indication is used to respond to the handover indication sent by the UE, to confirm the handover to be executed. Optionally, the response may also contain other information, such as a cell identifier, used to indicate a handover target cell. The cell identifier may also be a beam identifier, a base station identifier, or a TRP identifier. The case where the response contains cell information may correspond to the foregoing case where the handover indication sent by the UE contains one or multiple cell identifiers.

In an implementation manner, the UE starts the handover to the target cell in one or more of the following cases:
when the handover indication is sent; and
when the response to the handover indication is received.

Optionally, the executing, by the UE, the handover to the target cell includes: starting downlink synchronization to the target cell, resetting the MAC layer, reestablishing a PDCP/ RLC layer (optional), and other operations. Herein, specific operations of executing the handover to the target cell by the UE are based on handover-related operations in the LTE system, and details are not described herein again.

Optionally, the UE considers that the target cell is a cell which meets the associated first condition and triggers a handover; or the UE considers that the target cell is a cell corresponding to the cell identifier carried in the response information corresponding to the handover indication message.

Embodiment 19

In this embodiment, the handover indication in step 2 in Embodiment 15 uses a mode of layer 1 (L1) signaling.

In an implementation manner, when the first condition in step 1 in Embodiment 15 is met, a UE RRC layer triggers the L1 to send an L1 handover indication to a base station. The base station herein refers to a source base station.

In an implementation manner, the handover indication signaling may be a specific scheduling request, where the scheduling request uses a specific physical time-frequency resource or a specific code sequence. The specific scheduling request refers to a scheduling request which is distinguished from a common one for requesting an uplink permission.

In an implementation manner, the L1 handover indication may be a preamble. The preamble may be a specific preamble allocated, for example, by using system information, by the system and used for the purpose of handover indication. For example, it is. In another implementation manner, the preamble used by the UE to send the handover indication may be allocated by the base station in an RRC message containing a handover command.

In an implementation manner, for step 2A in Embodiment 15, a response to the handover indication may be RRC signaling, or may also be a specific MAC CE. The response to the handover indication is used to respond to the handover indication sent by the UE, to confirm the handover to be executed. Optionally, the response may also contain other information, such as a cell identifier, used to indicate a handover target cell. The cell identifier may also be a beam identifier, a base station identifier, or a TRP identifier. The case where the response contains cell information may correspond to the foregoing case where the handover indication sent by the UE contains one or multiple cell identifiers.

As described in Embodiment 15, step 2A is optional. That is, the UE does not need to wait to receive the response message to the handover indication.

In an implementation manner, the UE starts the handover to the target cell in one or more of the following cases:
when the handover indication is sent; and
when the response to the handover indication is received.

Optionally, the executing, by the UE, the handover to the target cell includes: starting downlink synchronization to the target cell, resetting the MAC layer, reestablishing a PDCP/ RLC layer (optional), and other operations. Herein, specific operations of executing the handover to the target cell by the UE are based on handover-related operations in the LTE system, and details are not described herein again.

Optionally, the UE considers that the target cell is a cell which meets the associated first condition and triggers a handover; or the UE considers that the target cell is a cell corresponding to the cell identifier carried in the response information corresponding to the handover indication message.

Embodiment 20 Handover Method Executed by a Base Station Side

Step 1: Receive a handover indication message sent by UE. The handover indication message may be described as handover indication information or a message containing handover indication information. The handover indication is used to notify the base station that the UE is about to start executing a handover, or in other words, the handover indication is used to notify the base station that a handover occurs. Examples of the handover indication message are given in Embodiments 16 to 19, but the handover indication message is not limited thereto.

Step 2: Send a response message to the UE. The response message is used to respond to the handover indication sent by the UE, to confirm the handover to be executed. Examples thereof are given in Embodiments 16 to 19, but the response message is not limited thereto. As described above, step 2 is an optional step.

Optionally, the handover is a conditional handover. That is, a handover command includes information about a first condition, and when the first condition is met, the UE starts executing a handover process. For example, the first condition may be a measurement event. For example, the first condition may be that signal quality in a neighboring cell is superior to that in a serving cell by a value exceeding a threshold for a period of time. The neighboring cell corresponds to a handover target cell.

Step 3: Stop data transmission and communication with the UE. By means of the foregoing steps, the base station is notified that the UE is about to be handed over to a target cell. Thus, the base station stops data transmission with the UE, so as to avoid waste of resources due to unnecessary data transmission/data loss.

Step 4: Start data forwarding to the target cell. By means of the foregoing steps, the base station is notified that the UE is about to be handed over to the target cell. Thus, the base station triggers forwarding of uplink or downlink data, which has not been sent or has not been successfully confirmed, to the target cell through an X2/Xn interface. Herein, the X2/Xn is a logic interface between base stations, and may be named in other manners in different systems or scenarios. The present application is not limited by this name.

Step 3 and step 4 are both optional. The present application does not limit the execution sequence of the foregoing steps.

Embodiment 21

This embodiment describes a configuration method of the first condition for a handover in the foregoing embodiments.

In an implementation manner, same as other measurement configurations, a configuration of the first condition is contained in a measurement configuration IE. By using a measurement configuration in the LTE system as an example, the configuration is contained in a measconfig IE, including a corresponding measurement object (measobject), report configuration (reportconfig), measurement identifier (measID), and the like. Optionally, different from a measurement configuration in current mechanisms, a report configuration thereof does not include these parameters: reportamount, reportinterval, and maxreportcells. The first RRC message containing a handover command contains a measID, which is contained in, for example, a mobility control information IE. Based on the measID, the UE can learn that a measurement configuration corresponding to the measID in the measurement configuration IE is used for the first condition. For ease of understanding, an example is given below. The first RRC message containing a handover command includes a measurement configuration IE and a mobility control information IE. The measurement configuration IE includes measurement configurations for measIDs of 1, 2 and 3. If the mobility control information IE contains a measID which is 2, the UE considers that the handover is a handover based on the first condition. Thus, the configuration of the first condition uses a configuration corresponding to the measID of 2. Optionally, if the configuration with the measID of 2 in the measurement configuration IE is used for the first condition, the UE does not need to give a measurement report.

In another implementation manner, same as other measurement configurations, the configuration of the first condition is contained in a measurement configuration IE. By using a measurement configuration in the LTE system as an example, the configuration is contained in a measconfig IE, including a corresponding measurement object (measobject), report configuration (reportconfig), measurement identifier (measID), and the like. Optionally, different from a measurement configuration in current mechanisms, a report configuration therein does not include these parameters: reportamount, reportinterval, and maxreportcells. The report configuration or the measurement object or the measurement identifier contains a target cell identifier which is consistent with that in the mobility control information IE. Based on the fact that the report configuration or the measurement object or the measurement identifier contains the target cell identifier, the UE determines that a measurement configuration corresponding to the report configuration or the measurement object or the measurement identifier is used for the first condition.

In another implementation manner, the report configuration or the measurement object or the measurement identifier may contain indication information. The UE determines, according to the indication information, that a measurement configuration corresponding to the report configuration or the measurement object or the measurement identifier is used for the first condition. The indication information may be of an enumerated type or a Boolean type, for example: conditionalhandover ENUMERATED {true}

In another implementation manner, the RRC message containing a handover command, or further, a mobility control information IE, may contain indication information. The UE determines, according to the indication information, that the handover is executed based on the first condition, or in other words, the handover is executed after the first condition is met. The indication information may be of an enumerated type or a Boolean type, for example: conditionalhandover ENUMERATED {true}

Embodiment 22 Processing Method for L2 During a Handover

This embodiment relates to a UE side, and provides a processing method executed by the UE for L2 according to an indication from a base station.

Step 1: Receive an RRC message containing a handover command and delivered by the base station.

Step 2: Process the L2 according to the RRC message or the handover command described in step 1.

For step 2, in an implementation manner, if the RRC message or the handover command indicates that a PDCP entity does not need to be reestablished, the UE does not reestablish the PDCP entity when using a configuration in the handover command to execute a handover. In an implementation manner, if the RRC message or the handover command indicates that an RLC entity does not need to be reestablished, the UE does not reestablish the RLC entity when applying the configuration in the handover command to execute the handover. In an implementation manner, if the RRC message or the handover command indicates that the L2 does not need to be reestablished, the UE does not reestablish the PDCP entity and the RLC entity when applying the configuration in the handover command to execute the handover. In an implementation manner, if the RRC message or the handover command indicates that the PDCP entity is reestablished, the UE reestablishes the PDCP entity when applying the configuration in the handover command to execute the handover. In an implementation manner, if the RRC message or the handover command indicates that the RLC entity is reestablished, the UE reestablishes the RLC entity when applying the configuration in the handover command to execute the handover. In an implementation manner, if the RRC message or the handover command indicates that the L2 is reestablished, the UE reestablishes the PDCP entity and the RLC entity when applying the configuration in the handover command to execute the handover. In an implementation manner, if the RRC message or the handover command does not include an indication of whether reestablishment of the PDCP entity is required, the UE reestablishes the PDCP entity by default when applying the configuration in the handover command to execute the handover. In an implementation manner, if the RRC message or the handover command does not include an indication of whether reestablishment of the RLC entity is required, the UE reestablishes the RLC entity by default when applying the configuration in the handover command to execute the handover. In an implementation manner, if the RRC message or the handover command does not include an indication of whether reestablishment of the L2 is required, the UE reestablishes the PDCP entity and the RLC entity by default when applying the configuration in the handover command to execute the handover.

According to this embodiment, the UE can determine, according to the indication from the base station, whether reestablishment of the PDCP entity or the RLC entity is required, thus avoiding overheads and a delay caused by unnecessary reestablishment of the PDCP entity or the RLC entity.

The method of the present application and the device involved have been described above with reference to the preferred embodiments. It should be understood by those skilled in the art that the methods shown above are only exemplary. The method of the present application is not limited to the steps and sequence described above. The network node and user equipment shown above may include more modules; for example, the network node and user equipment may further include modules that can be developed or developed in the future to be applied to a base station or UE, and the like. The various identifiers in the description are merely illustrative rather than restrictive. The present application is not limited to specific elements as examples of these identifiers. Those skilled in the art can make various alterations and modifications according to the teachings of the illustrated embodiments.

It should be understood that the above-described embodiments of the present application may be implemented through software, hardware, or a combination of software and hardware. For example, various components of the base station and user equipment in the above embodiments can be implemented through multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments of the present application disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present application. The computer program logic enables a processor to perform the operations (methods) described in the embodiments of the present application when the product is executed on at least one processor of a computing system. The settings in the present application are typically provided for software set or coded on a computer readable medium such as an optical medium (such as a CD-ROM), a floppy disk, or a hard disk, code and/or other data structures, other media for firmware or microcode on one or more ROM or RAM or PROM chips, a downloadable software image in one or more modules, a shared database, or the like. Software or firmware or such configuration may be installed on a computing device such that one or more processors in the computing device perform the technical solutions described in the embodiments of the present application.

In addition, each functional module or each feature of the base station device and the terminal device used in each of the above embodiments may be implemented or executed by a circuit, which is usually one or more integrated circuits. Circuits designed to execute various functions described in this description may include general purpose processors, digital signal processors (DSPs), application specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when advanced technologies capable of replacing the current integrated circuit emerge due to advancement in semiconductor technologies, the present application can use an integrated circuit obtained by using the advanced technologies.

Although the present application has been described with reference to the preferred embodiments of the present application, persons skilled in the art can understand that various modifications, substitutions and changes can be made to the present application without departing from the spirit and scope of the present application. Therefore, the present application should not be limited by the foregoing embodiments, but by the appended claims and their equivalents.

The program running on the device according to the application may be a program which implements functions of the embodiments of the present application by using a central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present application may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by a circuit (for example, a single-chip or multi-chip integrated circuit). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies capable of replacing the current integrated circuit emerge due to advancement in semiconductor technologies, the present application can be implemented by using the new integrated circuit technologies.

The program running on the device according to the present application may be a program which implements functions of the embodiments of the present application by using a CPU. The program or information processed by the program can be stored temporarily in volatile memory (e.g., random access memory RAM), hard disk drive (HDD), non-volatile memory (e.g., flash memory), or other memory systems.

Furthermore, the present application is not limited to the embodiments described above. Although various examples of the described embodiments have been described, the present application is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present application have been described in detail above with reference to the accompanying drawings. However, the specific structures are not limited to the above embodiments, and the present application also includes any design modifications that do not depart from the main idea of the present application. In addition, various modifications can be made to the present application within the scope of the claims, and embodiments resulting from the appropriate combination of the technical means disclosed in different embodiments are also included within the technical scope of the present application. In addition, components with the same effect described in the above embodiments may be replaced with one another.

What is claimed is:

1. A method performed by a base station (BS), the method comprising:
    receiving, from a user equipment (UE), a message indicating that the UE is capable of performing a conditional handover; and
    transmitting, to the UE, a set of one or more conditional handover configurations, each conditional handover configuration in the set of conditional handover configurations comprising:
        information associated with a corresponding candidate cell, and
        a handover condition comprising a measurement event based on a signal quality of at least one of a serving cell and the corresponding candidate cell, wherein:
    after transmitting, to the UE, the set of conditional handover configurations, the UE:
        stores the set of conditional handover configurations; and
        performs a handover monitoring to evaluate one or more handover conditions included in the set of conditional handover configurations.

2. The method of claim 1, wherein the message further indicates that the UE is capable of performing the conditional handover without requiring to receive a command from the BS to perform the conditional handover.

3. The method of claim 1, wherein during performing the handover monitoring, if the UE determines that a handover condition of a conditional handover configuration in the set of conditional handover configurations is met, the UE performs the conditional handover to handover to a candidate cell that is associated with the conditional handover configuration.

4. The method of claim 3, wherein the UE further releases the stored set of conditional handover configurations after determining that the conditional handover is successfully performed.

5. The method of claim 1, further comprising transmitting, to the UE, a radio resource control (RRC) message, wherein the UE:
    releases at least one of the stored set of conditional handover configurations that is associated with an identifier that is included in the RRC message.

6. The method of claim 1, further comprising:
    transmitting, to the UE, a radio resource control (RRC) message to indicate to the UE to transition to an RRC Inactive state, wherein, after receiving the RRC message, the UE:
    releases the stored set of conditional handover configurations, and
    transitions to the RRC Inactive state.

7. The method of claim 1, wherein the UE releases the stored set of conditional handover configurations after detecting a radio link failure.

8. The method of claim 1, wherein:
    each of the one or more handover conditions is configured by a measurement identifier that is used to indicate a measurement report configuration associated with each of the one or more handover conditions,
    the measurement report configuration comprises information used to indicate that the measurement report configuration is associated with one of the one or more handover conditions, and the UE does not perform a measurement report associated with the measurement report configuration.

9. The method of claim 1, wherein the message comprises a UEcapabilityinformation message.

10. A base station (BS), comprising:
one or more non-transitory computer-readable media storing one or more computer-executable instructions; and
at least one processor coupled to the one or more non-transitory computer-readable media, and configured to execute the one or more computer-executable instructions to cause the BS to:
receive, from a user equipment (UE), a message indicating that the UE is capable of performing a conditional handover; and
transmit, to the UE, a set of one or more conditional handover configurations, each conditional handover configuration in the set of conditional handover configurations comprising:
information associated with a corresponding candidate cell, and
a handover condition comprising a measurement event based on a signal quality of at least one of a serving cell and the corresponding candidate cell,
wherein:
after transmitting, to the UE, the set of conditional handover configurations, the UE:
stores the set of conditional handover configurations; and
performs a handover monitoring to evaluate one or more handover conditions included in the set of conditional handover configurations.

11. The BS of claim 10, wherein the message further indicates that the UE is capable of performing the conditional handover without requiring to receive a command from the BS to perform the conditional handover.

12. The BS of claim 10, wherein during performing the handover monitoring, if the UE determines that a handover condition of a conditional handover configuration in the set of conditional handover configurations is met, the UE performs the conditional handover to handover to a candidate cell that is associated with the conditional handover configuration.

13. The BS of claim 12, wherein the UE further releases the stored set of conditional handover configurations after determining that the conditional handover is successfully performed.

14. The BS of claim 12, wherein the at least one processor is further configured to execute the one or more computer-executable instructions to cause the BS to transmit, to the UE, a radio resource control (RRC) message, wherein the UE:
releases at least one of the stored set of conditional handover configurations that is associated with an identifier that is included in the RRC message.

15. The BS of claim 10, wherein the at least one processor is further configured to execute the one or more computer-executable instructions to cause the BS to transmit, to the UE, a radio resource control (RRC) message to indicate to the UE to transition to an RRC Inactive state, wherein, after receiving the RRC message, the UE:
releases the stored set of conditional handover configurations, and
transitions to the RRC Inactive state.

16. The BS of claim 11, wherein the UE releases the stored set of conditional handover configurations after detecting a radio link failure.

17. The BS of claim 10, wherein:
each of the one or more handover conditions is configured by a measurement identifier that is used to indicate a measurement report configuration associated with each of the one or more handover conditions,
the measurement report configuration comprises information used to indicate that the measurement report configuration is associated with one of the one or more handover conditions, and
the UE does not perform a measurement report associated with the measurement report configuration.

18. The BS of claim 10, wherein the message comprises a UEcapabilityinformation message.

* * * * *